March 22, 1932. J. T. DICKSON 1,850,226
COUPLING
Filed Jan. 16, 1930   2 Sheets-Sheet 2

Inventor:
James T. Dickson
by: Attorney

Patented Mar. 22, 1932

1,850,226

UNITED STATES PATENT OFFICE

JAMES T. DICKSON, OF LOS ANGELES, CALIFORNIA

COUPLING

Application filed January 16, 1930. Serial No. 421,201.

My invention relates to couplings for connecting a driving element with a driven element. Primarily the object of my invention is to embody in a coupling means which will gradually and automatically pick up the load when the prime mover is started and as the prime mover increases to maximum speed. In other words the coupling when constructed in accordance with my invention is capable of transmitting motion to the load after delayed action or "lag", thereby preventing overload and producing smoother operation.

Among further objects are simplicity of construction and greater effectiveness in use.

Figure 1:
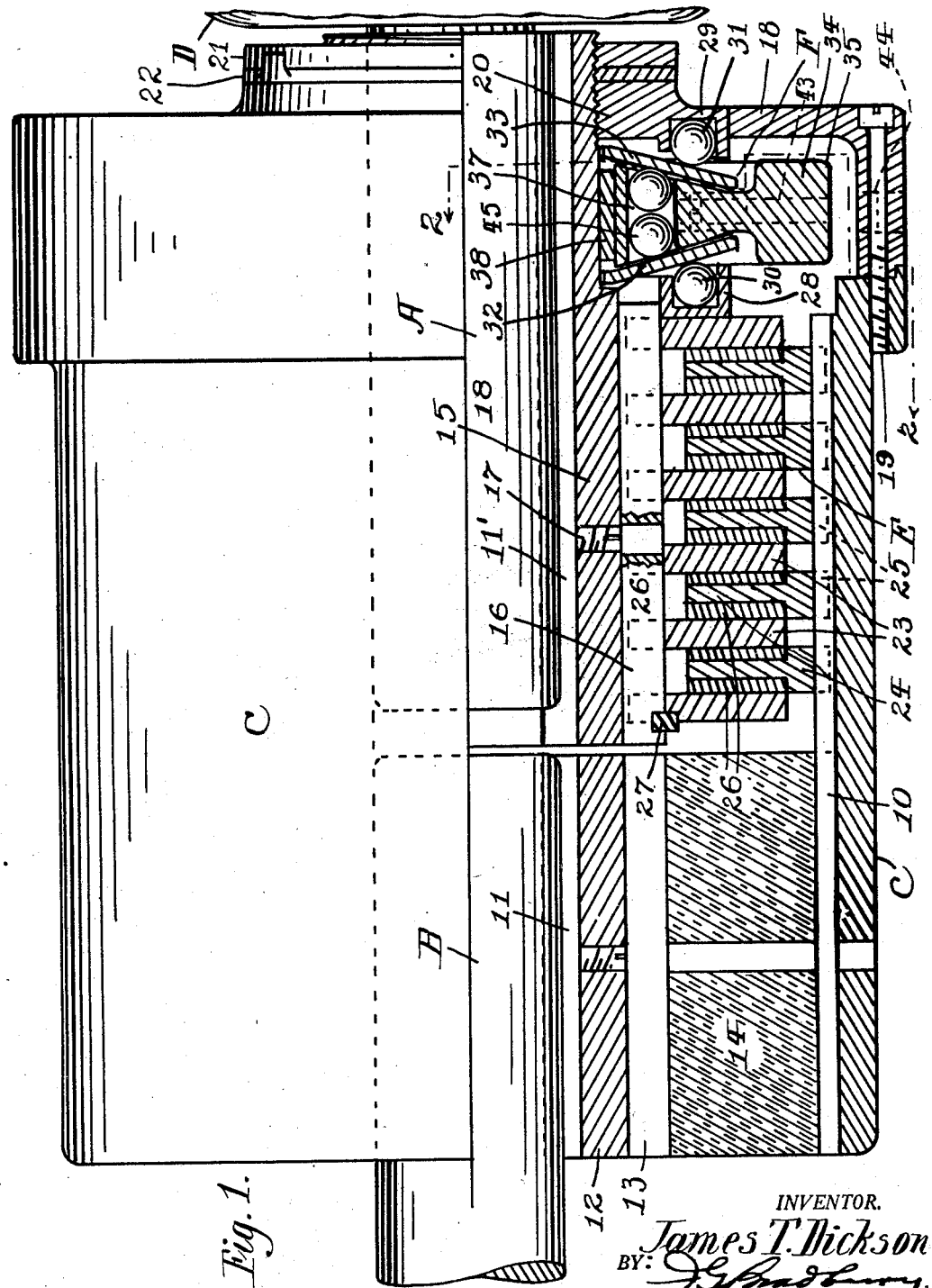
Figure 2:
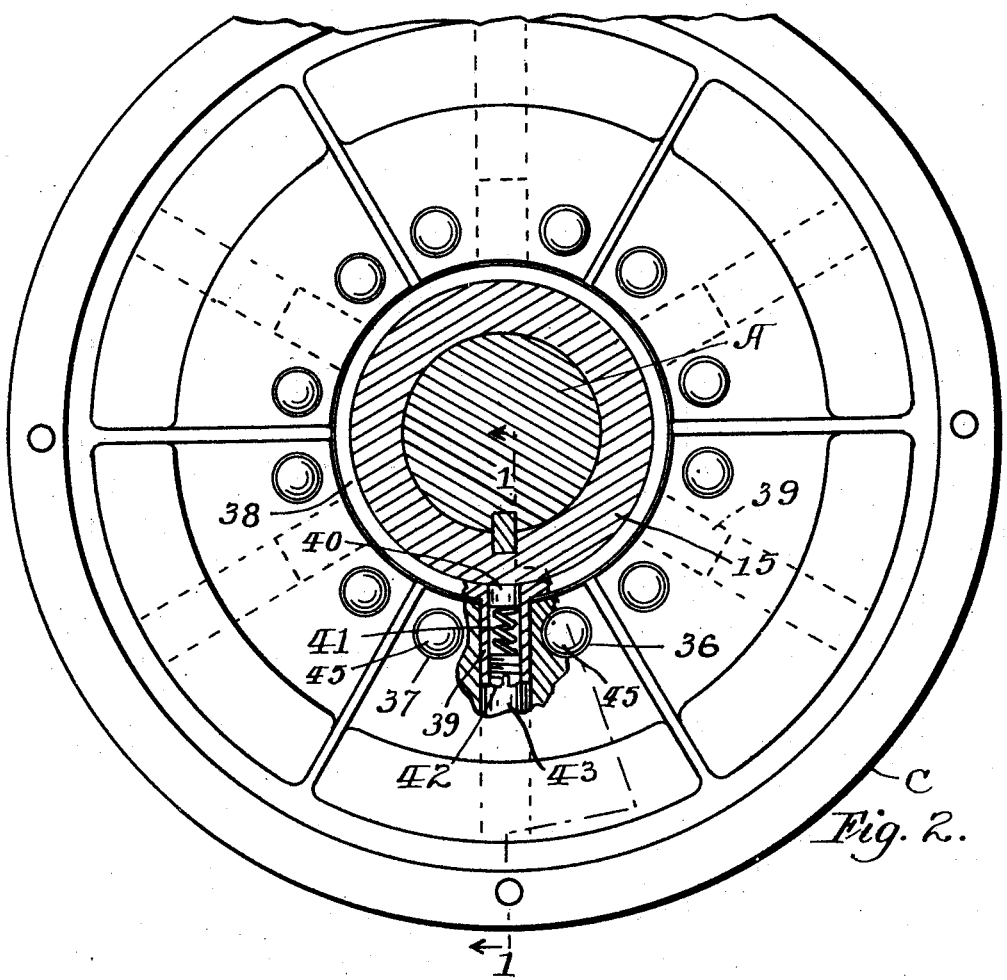
Figure 3:
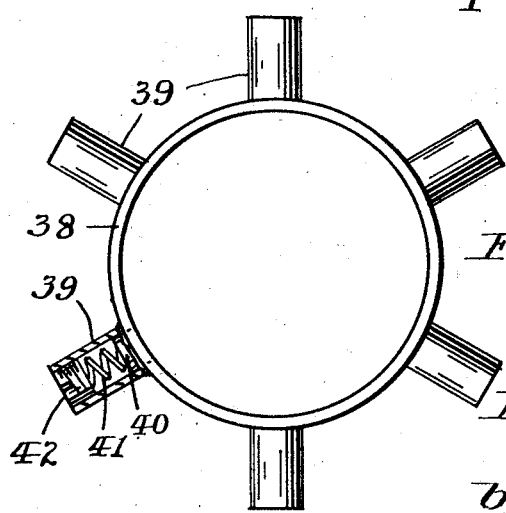

In the drawings forming part of this specification Fig. 1 is a side elevation of my invention, partly in section on the line 1—1 of Fig. 2; Fig. 2 is a section taken on the line 2—2 of Fig. 1, and Fig. 3 is a side elevation of the drag ring.

In the drawings A indicates the driving shaft of a prime mover which may be an electric motor or any other power unit and B indicates a driven shaft of any actuated unit such as a machine tool or any other driven element. C indicates my improved coupling which is shown co-operating and connected with said shafts, all of said parts being arranged in co-axial alignment. The coupling resembles in outward appearance as shown a hollow cylindrical casing having internal gear teeth 10. In one end of said casing and connected to said driven shaft B by key or feather 11 is a pinion gear 12 having external teeth 13 and between the pinion gear 12 and internal gear or casing C is molded a solid resilient gear 14, made out of rubber composition or any other suitable material to assist in automatically self centering the connected parts. Said resilient or self centering connection is not essential to my invention it being feasible to connect the casing with the driven element rigidly to enable the parts to revolve concentrically.

The means for connecting the drive shaft A to the driven shaft B is through the coupling casing C and by the following mechanism. Mounted upon shaft A and connected thereto by key or feather 11' is a pinion 15 having external teeth 16, said pinion being secured to said key by a set screw 17 to prevent longitudinal movement. The end of the coupling casing C opposite that containing the flexible centering unit 14 is provided with an end cap 18, said cap being secured to the end of the casing by screws 19 threaded to the outer end of pinion 15 and secured by a lock nut 21 and co-operating lock disc or ring 22 in fixed position within the cap is an antifriction bearing support 20.

Enclosed within the coupling casing C is a friction clutch unit E and a centrifugal clutch actuator F, said parts being adapted to automatically impart delayed clutching action and transmit motion from the driving element to the driven element.

The clutch unit E is composed of a plurality of spaced internally toothed flat rings 23, the internal teeth of which mesh and lock with the teeth 13 of pinion 15, thus causing said rings to act as the driving clutch members. These driving clutch rings have co-operating intermeshing toothed rings 24 constituting driven clutch members, the latter having external teeth 25 meshing with the internal teeth 10 of the clutch casing C to revolve the latter and transmit motion to the driven member B. Interposed between the friction faces of the driving and driven clutch rings are flat friction rings 26 made out of fibre, metal or other suitable material. These rings may be the usual metal type having cork inserts. The gang of rings thus assembled is held between the split ring 27 on the pinion 15 and the ball bearing race ring 28 of clutch actuator F, said race ring encircling one end of the teeth 16 of pinion 15. Thus when the clutch rings are compressed, motion is transmitted from the driving element to the driven element.

The clutch actuator is composed of a pair of corresponding opposed race rings 28 and 29, the latter being integral with and adjustable by bearing support 20 to take up wear. In these race rings which are concentric with the axis of shaft A are assembled a series of antifriction balls or rollers 30 and 31. One antifriction bearing thus formed is freely movable to spread from its companion and compress the clutch rings while the other is fixed to act as an antifriction abutment so that all of the spreading action is imparted by the movable member. Arranged between and bearing upon these antifriction bearings are a pair of radially converging flat bearing rings 32 and 33 upon which the bearing balls 30 and 31 roll. These converging bearing rings freely encircle the pinion 15 and are adapted to be spread to operate the clutch by the plurality of centrifugal weights 34 which resemble segments assembled concentrically around driving shaft element A. These segments are weighted at 35 on their outer ends and have outwardly converging inner circular sides freely disposed between the inner faces of bearing rings 32 and 33. Each of said segments has a pair of transverse ball receiving sockets 36 and 37 in each of which is placed a pair of balls 45. These balls 45 act as antifriction bearings against the bearing plates 32 and 33. Thus as the weights revolve and establish centrifugal force they automatically spread the bearings 28 from 29 after delayed action and cause the clutch to transmit motion from the driving member to the driven member. The delayed clutching action prevents overload upon the prime mover and reduces strain upon the working parts. The centrifugal segments or spreaders are mounted upon a drag ring 38 which is formed with a plurality of radiating posts 39, there being one post for each segmental weight upon which said segment is free to slide outwardly and inwardly in spaced relation to its companion. All or any number of said posts, if desired contain a friction disc 40 projecting through drag collar 38 and bearing upon the smooth periphery of pinion 15, a compression spring 41, and an adjustable screw compressor 42. Said screw 42 can be turned and adjusted by a screw driver inserted through a corresponding post receiving bore 43 in the companion segment and a corresponding plugged hole 44 in the side of the end cap 18. The function of the spider drag and its co-operating parts is to regulate the "lag" or delayed clutch engagement.

In operation it will be assumed that shaft A is connected with an electric motor or any other prime mover, which it is desired to have pick up the load gradually, through the medium of the coupling. The prime mover is started and its rotor increases to maximum speed, the actuator F gradually and increasingly expands, the motion transmitting end thrust element 28 compresses the clutch plates to gradually and increasingly engage. After delayed action or "lag" the full power from the prime mover is thus transmitted to the shaft B substantially without lost energy. Lag is obtained by means of the spider drag 38, segmental weights 34 and clutch E which pick up the load slowly and automatically. The coupling can be easily and readily applied to driving and driven elements and in addition to coupling them together performs the function of automatically imparting delayed action or "lag" when the prime mover starts to transmit motion to the driven element. The invention also provides adjustable means for accomplishing such action in a coupling whereby the period of delay or "lag" can be regulated as desired. In accordance with the patent statutes, I have described the principles of operation of my invention together with the construction which I now consider to represent the best embodiment thereof, but I desire to have it understood that the structure shown is only illustrative and that the invention can be carried out by other means and applied to uses other than those above set forth within the scope of the following claims.

Having described my invention what I claim as new and desire to secure by Letters Patent is:

1. A coupling for connecting a drive member with a driven member, comprising, in combination, a casing adapted to be connected with said driven member, clutch members connected with said casing having centrifugal actuated weights clustered around said drive member for communicating motion to said driven member, a spider lag ring movably connected outwardly with said weights to hold them in circumferentially spaced relation, and an adjustable drag connection inwardly between said ring and the drive member adapted to gradually actuate the clutch members under a starting torque having delayed action or lag.

2. A coupling for connecting a drive member with a driven member, comprising, in combination, a casing adapted to be connected with said driven member, clutch members connected with said casing having centrifugal actuated weights clustered around said drive member for communicating motion to said driven member, a spider lag ring pinioned outwardly in said weights to hold them in circumferentially spaced relation, a resilient connection inwardly between said ring and the drive member adapted to gradually actuate the clutch members under a starting torque having delayed action or lag, and means for adjusting the pressure inwardly of said resilient connection, said adjusting means being accessible through said casing.

In testimony whereof I have signed my name to this specification, this 16th day of December, 1929.

JAMES T. DICKSON.